Figure 1:
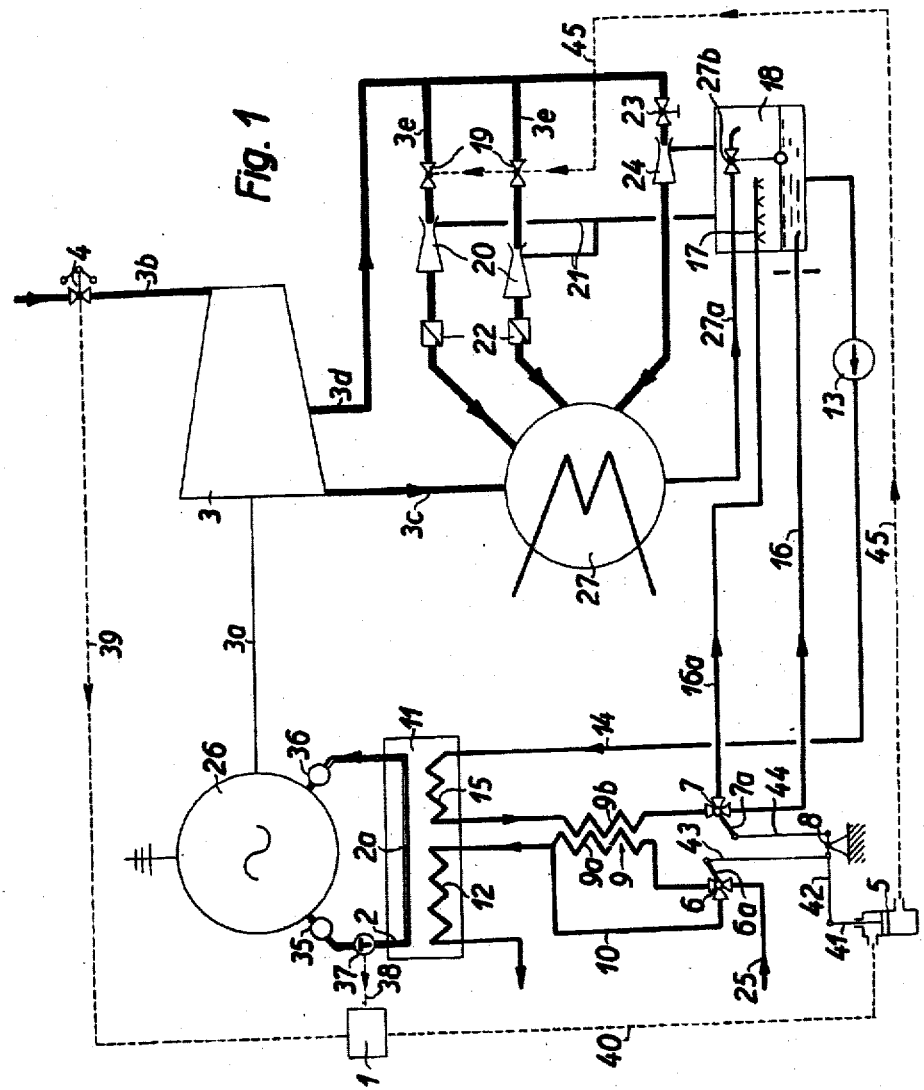

April 26, 1960     L. HELLER ET AL     2,934,655
PROCESS OF AND APPARATUS FOR COOLING ELECTRICAL GENERATORS
Filed Dec. 15, 1958     2 Sheets-Sheet 1

INVENTORS
LASZLO HELLER + ARPAD BAKAY

2,934,655

Patented Apr. 26, 1960

2,934,655

PROCESS OF AND APPARATUS FOR COOLING ELECTRICAL GENERATORS

Laszlo Heller and Arpad Bakay, Budapest, Hungary, assignors to Licencia Találmányokat Értékesítő Vállalat, Budapest, Hungary, a firm Application December 15, 1958, Serial No. 780,526

Claims priority, application Hungary December 16, 1957

10 Claims. (Cl. 290—2)

This invention relates to a process of and apparatus for cooling electrical generators, and in particular to the controlling of a process and apparatus of this type in which use is made of both "natural cooling" and "artificial cooling" of the usually gaseous cooling medium circulated through the generators, as disclosed in a copending application Ser. No. 779,445, filed December 10, 1958.

As is fully set forth in the above-mentioned copending application, the term "natural cooling" designates a cooling or heat-extracting operation effected by means of natural cooling water, while the term "artificial cooling" designates a cooling or heat-extracting operation effected by means of a conventional refrigerant which is circulated by a refrigerating machine and is itself cooled by evaporation in an evaporator of such a machine.

Briefly stated, one of the fundamental characteristics and features of the invention disclosed in the aforesaid copending application is the provision of a steam jet ejector-actuated cooling equipment for the artificial cooling or refrigerating machine, the working steam for which is bled, after being partly used, from the steam turbine which drives the generator, the vapors forming in the evaporator of the refrigerating machine being pressed by the ejector or ejectors into the condenser of the turbine. An important part of this system is that the main heat exchanger in which the generator cooling gas is cooled is divided into two parts one of which is traversed only by refrigerant condensate which is itself cooled either by fresh cooling water or by evaporation in the refrigerating machine, while the other part is traversed only by fresh cooling water. Stated in other words, in that part of the heat exchanger generally employed for artificial cooling of the generator cooling gas, only the condensate circulating in the ejector-actuated refrigerating system flows even when the condensate is cooled by natural cooling water and not artificially, i.e., by evaporation. In such cases the cooling of the condensate is effected by passing it through a further or auxiliary heat exchanger through which the natural cooling water also flows in heat exchange relationship with the condensate. If, however, artificial cooling is in operation, the fresh cooling water bypasses the auxiliary cooling device or heat exchanger.

The aim of the invention disclosed in the aforesaid copending application is not only to obtain a better generator output even with warmer cooling water but, for the sake of an increased generator limit output, to achieve a greater generator load by artificial cooling. Thus, even a change of load may call for a change-over from natural to artificial cooling, a procedure which, by its inherent characteristics, can be achieved only by the automatization of the control of the entire system.

Such an automatic control process, however, may also be used in such systems in which the auxiliary heat exchanger is dispensed with due to the fact that for natural cooling the fresh cooling water passes through both the "hot" and "cold" parts of the main heat exchanger, while for artificial cooling the water passes only through the "hot" side or part of the main heat exchanger, the "cold" side or part being traversed by refrigerant condensate cooled by evaporation in the evaporator of the refrigerating machine. The terms "hot" and "cold" designate, of course, the parts of the main heat exchanger located adjacent the entry and exit points, respectively, of the generator cooling medium. In this case, therefore, during natural cooling the condensate is merely caused to circulate into and out of the evaporator, as by a suitable pump, without being permitted to flow into the heat exchanger, by way of contradistinction with the first-described cooling system in which even during natural cooling the "cold" part of the main heat exchanger is traversed by the condensate.

It is, therefore, an important object of the present invention to provide a novel and highly efficient automatic and continuous control of the cooling of the generator cooling medium.

Another important object of the present invention is to provide means for controlling the cooling of the generator cooling medium in accordance with variations in the temperature of such cooling medium when the same leaves and reenters the generator.

Still a further object of the present invention is the provision of an automatic control process and system for the cooling of electrical generators, by means of which process and system the generator cooling medium may be cooled either naturally or artificially depending on the operating conditions existing at any particular time.

Concurrently it is also an important object of the present invention to provide, in such a control process and system, an automatic switching of the cooling operation from artificial cooling to natural cooling or vice versa, depending on variations in the temperature conditions of the gaseous generator cooling medium.

Fundamentally, a control system as contemplated by the present invention must fulfill the following requirements:

(1) It has to ensure that the temperature prevailing in the generator does not exceed the prescribed maximum either upon a rise of the load or upon an increase in cooling water temperature. This is all the more important as it prevents not only the harmful warming up of the structural materials but also the occurrence of detrimental power effects caused by the temperature rise between structural materials of different thermal expansion properties. The attainment of this control object is rather complicated by virtue of the fact that with decreasing load, in case of a given cooling water temperature, the temperature of the cooling gas will also steadily fall. Conversely, with increasing generator load, likewise at a given cooling water temperature, the temperature of the cooling gas tends to rise.

The foregoing will be readily understood when it is realized that at a higher load, the loss heat to be dissipated increases. This increased quantity, with unchanged pressure and unchanged quantity of cooling gas circulated, can be dissipated, however, only by increasing the temperature difference between the generator conductor surfaces and the cooling gas. For all practical purposes, of course, such an increased temperature difference can be achieved only by a more extensive lowering of the temperature of the cooling gas prior to its entry into the generator since the permissible maximum temperature in the generator cannot be exceeded. Thus, although with a reduced generator load the temperature of the cooling gas falls automatically, with an increase in load, after reaching a predetermined value, this temperature must be artificially lowered.

Accordingly, the primary function of the control is to set the maximum value of the cooling gas temperature at its exit point from the generator as a reference or impulsesending value, and its secondary function is to maintain this set value by the appropriate switching in of the cooling equipment.

(2) Since as long as the temperature of the cooling gas does not exceed the set value, the system operates only with natural cooling, i.e., with the fresh cooling water passing either through the auxiliary cooling device or through both parts of the main heat exchanger, the control system must change the cooling operation from natural to artificial cooling whenever the temperature reaches the said set value.

(3) The output of the artificial cooling and the temperatures of the circulating condensate, respectively, have to be so set as to obtain a cooling gas temperature which at its maximum corresponds to the set value.

(4) With respect to the system employing both a main and an auxiliary heat exchanger, care must be taken that simultaneously with the switching in of artificial cooling, the fresh cooling water is diverted so as to bypass the auxiliary heat exchanger prior to its entry into the main heat exchanger. Correspondingly, with respect to the system employing only a main heat exchanger the "cold" part of which is adapted to be traversed by both fresh water and condensate, care must be taken that simultaneously with the switching of artificial cooling, the fresh cooling water is blocked off from the "cold" part of the heat exchanger and is permitted to flow only into the "hot" part of the heat exchanger.

(5) Care has to be taken that, during artificial cooling, the circulating condensate should pass into the sprayers of the evaporator, while during natural cooling it should be led into the evaporator at a point below the liquid level therein. This is necessary because, during artificial cooling, the returning warmed up condensate must flow through the nozzles in order to achieve the evaporation needed for the recooling or, in other words, to obtain the requisite augmented evaporating surface needed for it, whereas during natural cooling the vaporization of the condensate, returning at unchanged temperature, would be a drawback since it would cause serious difficulties in the setting of the ejector which serves for the deaeration of the evaporator. The ejector would suck in a part of the vaporized or atomized condensate, in the form of steam, since otherwise the atomized condensate would suck steam back into the evaporator and would thus practically operate as a "condenser." If, however, according to the present invention, in case of natural cooling, the condensate is directed to enter the evaporator at a location close to the suction pipe of the circulating pump, below the liquid level in the evaporator and through a separate pipe, this ensures that there is no effect whatever on the conditions prevailing in the space above the liquid level of the evaporator, and the deaerating ejector may operate undisturbed and with a minimum quantity of steam.

(6) Care must also be taken that in the evaporator of the refrigerating machine there is maintained a pressure corresponding to the desired temperature conditions even during natural cooling.

The systems according to the present invention solve all these problems and enable these requirements to be met most simply and thus most economically. The various valves employed to direct the flow of the natural cooling water and condensate are so connected with their operating elements as to ensure in a simple manner the mutual forced shifting movements thereof, thereby eliminating the possibility of wrong operations.

Figure 2:
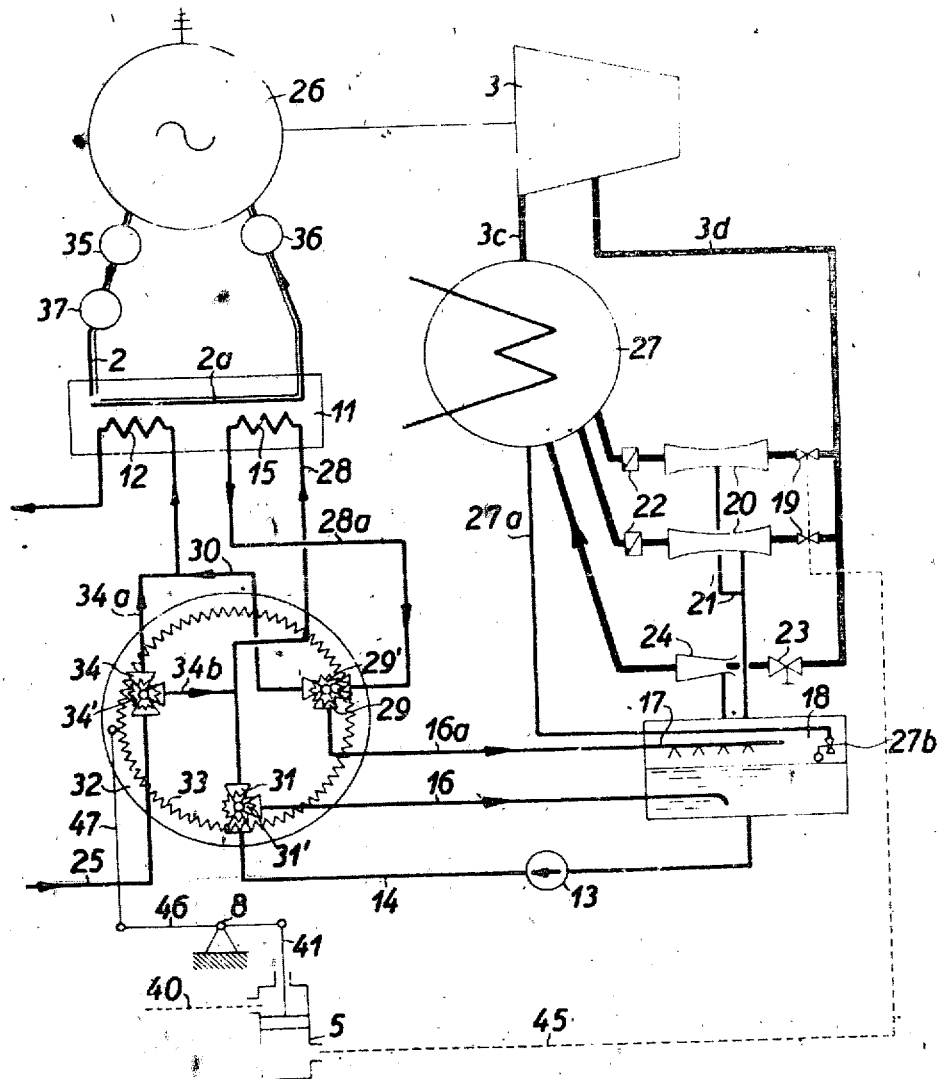

The foregoing and other objects, advantages and characteristics of the present invention will become more fully clear from the following detailed description thereof when read in conjunction with the accompanying drawings, in which:

Fig. 1 is a diagrammatic and schematic illustration of a control system constructed in accordance with the principles of the present invention and adapted for use with a combined main and auxiliary heat exchanger type of generator cooling arrangement; and Fig. 2 is a diagrammatic and schematic illustration of a modified type of control system adapted for use with a cooling arrangement in which only one heat exchanger is employed.

Referring first to Fig. 1, a generator 26 (representative of a complete power station as explained in the above-mentioned copending patent application) is there shown as being driven by a steam turbine 3 through the intermediary of suitable means 3a. A conduit 2, which may be provided with pump means for circulating the generator cooling medium (usually a gas, such as air, hydrogen or the like, although a liquid may also be used), is provided with an intermediate portion 2a disposed in a main heat exchanger 11 in which it is placed into heat exchange relationship with two coils or like conduits 12 and 15. These coils are in communication with the two coils 9a and 9b, respectively, of an auxiliary heat exchanger 9, in which the natural cooling water and the condensate may be placed into heat exchange relationship with each other. A water feed conduit 25 communicates with the coil 9a, a three-way valve 6 being incorporated in the conduit to permit the water to be diverted, when desired, into a conduit 10 bypassing the coil 9a. Condensate is fed into the main heat exchanger coil 15 through a conduit 14 and from the evaporator 18 of a refrigerating machine by means of a pump 13 incorporated in the conduit 14. A three-way valve 7 controls the outlet of the auxiliary heat exchanger coil 9b and enables the condensate to be directed either into a conduit 16 communicating with the evaporator 18 at a point below the liquid level therein, or into a conduit 16a terminating in a plurality of nozzles or sprayers 17 in the evaporator above the liquid level therein.

The turbine 3 is provided with a steam supply conduit 3b, in which is located a load controller or governor 4, and with two steam exhaust conduits 3c and 3d. The main exhaust conduit 3c communicates with a condenser 27 which in turn communicates with a return conduit 27a the outlet end of which is located in the evaporator 18 and controlled by a float-operated, liquid level-responsive valve 27b. The auxiliary steam exhaust conduit 3d, by means of which partly used steam may be bled from the turbine 3, communicates via a valve 23 with a steam jet ejector 24 which deaerates the evaporator 18 to the condenser 27 of the turbine 3. The conduit 3d also communicates with a pair of conduits 3e in each of which is arranged a valve 19 controlling the inlet to a respective steam jet ejector 20, the outlets of which are in communication via check valves 22 with the condenser 27, and the suction points of which are in communication via conduits 21 with the top of the evaporator 18. Thus, the ejectors 20 are employed to draw and press condensate vapors from the evaporator into the condenser to aid in the cooling of the condensate in the evaporator by evaporation.

As will be understood by reference to the hereinbefore mentioned copending application, the means 17—18 etc. constitute a refrigerating machine which, in lieu of its own condenser, makes use (for the sake of enhanced economy of operation) of the condenser of the steam turbine. It will further be understood that at all times only condensate flows through the coils 15 and 9b, and only fresh cooling water flows through the coils 9a and 12.

The operation of the structure so far described is fully set forth in the aforesaid copending application and may be summarized as follows:

When natural cooling is desired, the steam jet ejectors 20 are shut down to stop evaporative cooling of the condensate which is, therefore, merely circulated by the pump 13 into the coil 15 (the "cold" part of the main heat exchanger 11) and thence into the coil 9b of the auxiliary heat exchanger 9, where the warmed condensate transfers its accumulated heat to the still cold water flowing through the coil 9a, from which the partly warmed water enters the coil 12 (the "hot" part of the main heat exchanger 11) for extracting further heat from the generator cooling medium. The condensate cooled in the coil 9b is returned to the evaporator via conduit 16.

On the other hand, when artificial cooling is desired, the fresh water is admitted to the coil 12 through the bypass conduit 10 while the condensate, which thus cannot be cooled while flowing through the coil 9b, is returned to the evaporator via conduit 16a and spray nozzles 17, the ejectors 20 being rendered operative at this time to aid the evaporation and consequent cooling of condensate in the evaporator. In order to compensate for vapors removed from the evaporator 18 by the ejectors 20, condensed steam and vapors are returned to the evaporator, as needed, via the conduit 27a.

The actual control means provided, according to the present invention, for setting the reference or nominal temperature value of the generator cooling medium, i.e., the maximum temperature to which the said medium may be permitted to rise before artificial cooling is required and initiated, comprise a plurality of temperature-sensing elements 35, 36 and 37, the first of which is inserted in the conduit or line 2 adjacent the cooling gas outlet of the generator 26, the second of which is inserted in the line 2 adjacent the cooling gas inlet of the generator, and the third of which is inserted in the line 2 between the sensing element 35 and the conduit portion 2a. Each of these temperature-sensing elements may be of the expanding fluid type, wherein the fluid is contained in a chamber closed by a diaphragm the movements of which, in response to variations in the fluid volume, are adapted to effect predetermined changes of an associated electrical resistance. The three resistances associated with the sensing elements 35 to 37 are connected in series with one another to ensure that the total resistance value rises with either an increase of the difference between the temperature of the cooling gas at the generator outlet and inlet or with an increase of the outlet cooling gas temperature.

The series-connected resistances are connected to one winding of a differential relay 1, as indicated schematically by the broken line 38, the other winding of the differential relay being connected to a variable resistance. In any suitable manner, as by electrical, mechanical or fluid pressure transmission means, the differential relay 1 may additionally be rendered responsive to the output of the generator so as to ensure that the aforesaid nominal temperature of the cooling gas corresponds to such output. By way of example, the relay may be connected with the turbine load controller or governor 4, as indicated schematically by the broken line 39. Alternatively, of course, the same effect may be attained by measuring the strength of either the output current of the generator or the excitation current therefor.

The output of the differential relay 1 is adapted to be transmitted in the form of an impulse of electrical, mechanical or fluid pressure energy to an operating or shifting device 5, as indicated schematically by the broken line 40. A movable part 41 of the device 5 is articulated to a lever 42 fulcrumed intermediate its ends at 8. Articulated to the lever 42 at opposite sides of the fulcrum 8 thereof are two link arms 43 and 44, the former of which is connected to the operating arm 6a of the three-way valve 6, and the latter of which is connected to the operating arm 7a of the three-way valve 7. The valves 6 and 7 may, of course, be designed for operation by the device 5 through electrical or fluid pressure means in lieu of the mechanical means illustrated. The shifting device 5 is further designed to transmit an operating impulse, either mechanically, electrically or by fluid pressure, as schematically indicated by the broken line 45, to the two operating valves 19 associated with the steam jet ejectors 20 in the conduits 3e.

In operation of the control system according to this embodiment of the invention, as long as the maximum cooling gas temperature is lower than the preset or nominal value thereof, the sum of the three resistances associated with the temperature-sensing elements 35, 36 and 37 and connected to the first coil of the differential relay 1 will be less than the adjusted fixed value of the variable resistance connected with the second coil of the differential relay, whereby the latter will send an impulse to the shifting device 5 which causes the latter to close the operating valves 19, thereby rendering the steam jet ejectors 20 inoperative. At the same time, the device 5 is caused to shift the three-way valves 6 and 7 into their "natural cooling" positions to permit fresh water to flow into the coil 9a of the auxiliary heat exchanger and to connect the outlet of the coil 9b of the auxiliary heat exchanger to the conduit 16. As set forth hereinabove and in the aforesaid copending application, the condensate will now be merely circulated by the pump 13 from the evaporator 18 through the conduit 14, coil 15, coil 9b and conduit 16 back to the evaporator (in which no evaporative cooling takes place). Any heat extracted by the condensate from the generator cooling gas in the "cold" part of the main heat exchanger 11 will be dissipated at coil 9b into the cold water flowing through coil 9a, which water, after so cooling the condensate, flows through the coil 12 to extract more heat from the generator cooling gas at the "hot" side of the main heat exchanger. All the loss heat of the generator accumulated by the cooling gas is, thus, ultimately absorbed by the cooling water.

In the event that the maximum temperature of the cooling gas rises to or above the set nominal value, the sum of the resistances associated with the temperature-sensing elements 35, 36 and 37 and connected to the first coil of the differential relay 1 will become greater than the adjusted fixed value of the variable resistance connected with the second coil of the differential relay 1, whereby the latter sends an impulse to the shifting device 5 to cause the same to switch the three-way valves 6 and 7, fitted into the cooling water and condensate pipes or conduits 25 and 14, respectively, over to their "artificial cooling" positions. Upon switching over of the three-way valves, which is accompanied by opening of the valves 19 for the steam jet ejectors 20 by the device 5 via means 45, the cooling water will not flow from pipe 25 to the "hot" part or coil 12 of the main heat exchanger 11 through coil 9a of the auxiliary heat exchanger 9, being diverted by valve 6 to flow through the bypass pipe or conduit 10. Thus, the condensate being circulated by the pump 13 and flowing through the "cold" part or coil 15 of the main heat exchanger, will not be cooled in the auxiliary heat exchanger 9, but, due to the setting of the three-way valve 7, will reach the evaporator 18 through the conduit 16a and sprayers 17, where it will be cooled by evaporation resulting from the action of the ejectors 20 as aided by the sprayers or atomizer nozzles 17.

Should the maximum cooling gas temperature now fall below the set value thereof, the above described process will work in reverse, beginning with the interruption of the supply of working steam to the ejectors 20 and continuing with the resetting of the three-way valves 6 and 7 into their original or "natural cooling" positions. The check valves 22, at this time, function to prevent ingress of steam into the evaporator from the condenser, since in their absence the condenser 27, which is connected to the delivery pressure pipes of the ejectors 20, would be in communication with the evaporator. At all times, of course, the evaporator 18 is deaerated to the condenser by ejector 24.

Referring now to Fig. 2, the control system there illustrated, being adapted for use with a generator cooling arrangement in which the provision of an auxiliary heat exchanger is dispensed with, differs somewhat from that illustrated in Fig. 1. To the extent that the two control systems are identical, a repetition of the description of the control system parts is deemed unnecessary, and correspondingly some of these parts are not illustrated in Fig. 2 or, if illustrated, are designated by the same reference numerals employed in Fig. 1.

The cooling arrangement itself differs from that shown in Fig. 1 as follows. The water feed pipe or conduit 25 is connected to a three-way valve 34 adapted, when in one position, to direct the flow of water into a conduit 34a leading directly to the "hot" part or coil 12 of the heat exchanger 11, and adapted, when in another position, to direct the flow of water into a conduit 34b. The latter merges with a conduit 28 feeding into the "cold" part or coil 15 of the heat exchanger 11 from a three-way valve 31 to which condensate is fed by the pump 13 from the evaporator 18. The valve 31, in one of its positions, permits flow of condensate into the conduit 28, and in the other of its positions directs the flow of condensate into the return conduit 16 leading to the evaporator and entering the same at a point below the liquid level therein. The outlet end of the coil 15 is connected to a conduit 28a leading to a three-way valve 29 which, in one of its positions, directs the condensate flow into the return conduit 16a leading to the sprayers or nozzles 17 in the evaporator, and in the other of its positions directs the condensate flow into a conduit 30 merging with the conduit 34a leading to the heat exchanger coil 12.

As can be readily seen, the control system of Fig. 2 differs from that of Fig. 1 essentially only in the structure of the switching means for the three-way valves. The shifting device 5, which is adapted to be actuated by impulses transmitted from the differential relay 1 (not shown in Fig. 2) by the means 40 and is likewise adapted to actuate the operating valves 19 via the means 45, is again provided with a movable member 41 articulated to one end of a lever 46 fulcrumed intermediate its ends at 8 and articulated at its other end to a link 47. The link 47 is in turn articulated at its other end to a rotatable drive plate 32 shaped as an internal gear having teeth 33. The valves 29, 31 and 34 are provided with operating pinions 29', 31' and 34', respectively, the teeth of which mesh with the teeth 33 of the gear 32.

In operation, for natural cooling the cooling water from conduit 25 passes through the three-way valve 34 which is set in such a way that the water flows into the conduit or pipe 28 and through it into the coil 15 of the heat exchanger 11. From this coil, the cooling water reaches the three-way valve 29 which is so set that the water will enter the conduit 30 and flow into the coil 12 of the heat exchanger 11. At the same time, the three-way valve 31 is so set that the condensate being circulated by the pump 13 flows from conduit 14 through the return pipe or conduit 16 into the evaporator 18. It will, therefore, be understood that with this arrangement the entire cooling is effected by the natural cooling water which, by this series-connection of the heat exchanger coils 15 and 12 passes first through the former and then through the latter, thereby dissipating the entire quantity of the loss heat. The valves 19 are closed at this stage, rendering the refrigerating machine inoperative.

When, due to a rise in the maximum cooling gas temperature in the conduit 2 to a value above the preset or nominal value, the differential relay sends to the device 5 the impulse required for initiating the artificial cooling, the device 5, through the intermediary of the moving mechanism 46—47, rotates the gear 32 which, by means of the pinions 29', 31' and 34', will switch over all three three-way valves simultaneously. The principle of mechanical moving is, of course, mentioned here only by way of example, as any other type of system, i.e., hydraulic, pneumatic or electrical, may be adopted.

After the change-over, the natural cooling water flows through the three-way valve 34 into the conduit 34a and through this into the "hot" part or coil 12 of the heat exchanger 11. At the same time, with conduit 34b closed by valve 34, the three-way valve 31 directs the flow of cold condensate into conduit 28 and thence to the "cold" part or coil 15 of the heat exchanger 11, while the three-way valve 29 blocks the way leading to pipe 30 and leads the condensate which has just passed through the "cold" part or coil 15 of the heat exchanger into conduit 16a and to the sprayers 17 of the evaporator. Concurrently, the valves 19 were opened by the shifting device 5 to render evaporative cooling of the heated condensate possible.

Due to the fact that the circulating pump 13 keeps the condensate in constant circulation, regardless of the position of the valve 31, the switching over from natural to artificial cooling or vice versa still calls for only one single operation, i.e., for the moving of the switching gear mechanism 32.

It will be appreciated that the mechanical switching arrangements 41—42—43—44 etc. and 41—46—47—32 etc., both of which may be replaced by electrical or fluid pressure-operated means, enable the process of the present invention, to wit the controlling of the cooling of the generator cooling medium, to be carried out simply and efficiently in direct response to the operational conditions or loading of the generator.

To illustrate the specific manner in which the principles of the present invention are put into practice, the following example may be considered. It is well known, in conformity with generally accepted practice, that a modern generator is constructed for operation at a given maximum permissible temperature. If, now, such a generator is to be operated at a still higher output, in accordance with one of the expressed objects of the invention, a greater amount of loss heat will have to be dissipated, which will require a greater difference between the temperatures of the generator parts on the one hand and the cooling medium on the other hand. Since, by virtue of the construction of the generator, it is impossible, within the limits of optimum operational efficiency, to raise the temperature of its parts, the only manner in which the required greater temperature difference can be attained is by lowering the temperature of the cooling medium, as previously set forth herein. Stated in other words, since the dissipation of a greater amount of loss heat will produce a greater temperature rise in the gaseous cooling medium, it is necessary to lower the inlet temperature thereof to such an extent that even with the greater temperature rise there is maintained a sufficient difference between the maximum or outlet temperature of the cooling medium and the rated maximum operating temperature of the generator parts.

By way of example, let it be assumed that a generator is to be operated at a temperature of 80° C. and that the cooling medium initially enters the generator at a temperature of 30° C. and leaves it at a temperature of 60° C. Thus, the minimum difference between the generator operating temperature and the maximum cooling medium temperature is 20°, while the temperature rise of the cooling medium during its passage through the generator is equal to 30°.

Should the load increase to such an extent that a loss of heat exceeding the normal amount by 33% must be dissipated in the generator, the minimum temperature difference between the generator and the cooling medium must be increased by 33% or 6.6°, yielding an ultimate difference of 26.6°. However, at the same time the temperature rise of the cooling medium will be increased by 33%, i.e., from 30° to 40°. Consequently, since the outlet temperature of the cooling medium will be 53.4° C., the inlet temperature of the cooling medium will have to be 13.4° C.

It will be readily seen that the needed lowering of the cooling medium temperatures is effected by the switching in of the artificial cooling arrangement, as described hereinabove, whenever the cooling medium temperature at the outlet of the generator exceeds a preset nominal value.

Although there have been described herein preferred embodiments of the present invention, it is understood that this disclosure is for the purpose of illustration only and that various omissions and changes in shape, proportion and arrangement of the parts, as well as the substitution of equivalent elements for the arrangements shown and described, may be made without departing from the scope of the invention as set forth in the appended claims.

Having this described the invention, what is claimed and sought to be protected by Letters Patent is:

1. The process of controlling the cooling of a cooling medium circulated through an electrical generator, comprising the steps of predetermining a nominal value for the outlet temperature of said cooling medium, sensing at least said outlet temperature, subjecting said cooling medium to a natural cooling operation as long as said sensed outlet temperature does not exceed said nominal value thereof, and subjecting said cooling medium to a combined natural and artificial cooling operation when said sensed outlet temperature exceeds said nominal value thereof.

2. The process of controlling, by means of natural cooling water and a refrigerating machine of the steam jet compressor type, the cooling of a cooling medium circulated through an electrical generator, comprising the steps of setting a nominal value for the temperature of said cooling medium in correspondence with the operating load of said generator, subjecting said cooling medium effectively only to the cooling action of said natural water upon said temperature being lower than said nominal value thereof, and subjecting said cooling medium to the joint cooling action of said natural cooling water and said refrigerating machine upon said temperature being higher than said nominal value thereof.

3. Apparatus for controlling the cooling of an electrical generator cooling medium by means of natural cooling water and the condensate of a steam jet compressor refrigerating machine equipped with steam jet ejector means and operating valve means for opening and closing the steam flow path to said ejector means, comprising means for sensing the temperature of said cooling medium, a load-responsive control member connected with said sensing means for setting a corresponding nominal value for said temperature, three-way valve means controlling the flow of said natural cooling water and said condensate into heat exchange relationship with said cooling medium, said three-way valve means being operable when in a first position thereof to direct said flow of water and condensate so as to render the water the only effective cooling agent, and further operable when in a second position thereof to direct said flow of water and condensate so as to render both of the same effective cooling agents, and switching means operatively connected to said operating valve means and to said three-way valve means and responsive to the output of said control member in response to signals from said sensing means for either closing said operating valve means to render said ejector means inoperative and simultaneously switching said three-way valve means into said first position thereof, or opening said operating valve means to render said ejector means operative and simultaneously switching said three-way valve means into said second position thereof, in accordance, respectively, with a decrease or an increase of said load.

4. Apparatus according to claim 3, wherein said generator is driven by a steam turbine, further comprising a load governor regulating the input of steam into said turbine, and means operatively interconnecting said control member with said load governor.

5. Apparatus according to claim 3, said sensing means comprising a plurality of temperature-responsive elements arranged at the cooling medium inlet and outlet locations of said generator, and means differentially connecting said sensing means to said control member for actuation of the latter in response to the difference between the inlet and outlet temperatures of said cooling medium.

6. Apparatus according to claim 3, said three-way valve means comprising a plurality of three-way valves, each of said three-way valves being provided with an operating pinion, said switching means comprising gear means meshing with said pinions for simultaneous operation of all of said three-way valves.

7. Apparatus according to claim 3, said three-way valve means comprising a plurality of three-way valves, each of said three-way valves being provided with an operating arm, said switching means comprising linkage means operatively connected to said operating arms for simultaneous operation of all of said three-way valves.

8. Apparatus for cooling an electrical generator driven by a steam turbine having a condenser for exhaust steam, comprising means for circulating a cooling medium through said generator, a heat exchanger for extracting loss heat from said cooling medium, at least first and second coils in heat exchange relationship sequentially with the initial and final sections of the path of flow of said cooling medium through said heat exchanger, evaporator means containing refrigerant condensate connected with said second coil, pump means for circulating said condensate from and back to said evaporator, first steam jet ejector means connected to said evaporator and operable by partly used exhausted steam from said turbine to effect evaporation of condensate in said evaporator and to force some of the resultant vapors into said condenser, operating valve means controlling the steam inlet to said first ejector means and adapted, when open, to render the same operative and, when closed, to render the same inoperative, check valve means operatively connected between the outlet of said first ejector means and said condenser for inhibiting return flow of steam from said condenser into said first ejector means, second steam jet ejector means operable by partly used exhaust steam from said turbine for deaerating said evaporator to said condenser, means for circulating natural cooling water at least through said first coil, three-way valve means controlling the flow of said water and condensate, shifting means operatively connected to said three-way valve means for switching the same to either a first position or a second position so as to render said three-way valve means operable to direct such flow to said heat exchanger in a manner corresponding to natural cooling or artificial cooling, respectively, said shifting means being further operatively connected to said operating valve means for closing the same when switching said three-way valve means to said first position and for opening said operating valve means when switching said three-way valve means to said second position thereof, and control means operatively connected with said shifting means and responsive to load conditions of said generator for substantially jointly actuating said three-way valve means and said operating valve means into the natural cooling or artificial cooling states thereof in accordance with corresponding load variations tending to produce lesser or greater temperature rises in said cooling medium during its passage through said generator.

9. Apparatus according to claim 8, said three-way valve means being operable, when in said first position thereof, to serially connect said second and first coils for flow of said cooling water through both said coils, while causing said condensate to bypass said second coil and be returned to said evaporator, said three-way valve means being operable, when in said second position thereof, to direct the flow of cooling water only into said first coil while directing the flow of condensate only into said second coil and thence back to said evaporator.

10. Apparatus according to claim 8, said three-way valve means being operable, when in said first position thereof, to direct said cooling water to said first coil and said condensate through said second coil and into heat exchange relationship with said cooling water prior to arrival of the latter at said first coil, and to thereafter direct said condensate for return entry into said evaporator at a point below the liquid level therein, said three-way valve means being operable, when in said second position thereof, to direct said condensate through said second coil for return entry into said evaporator at a point above the liquid level therein, and to direct said cooling water to said first coil out of heat exchange relationship with said condensate leaving said second coil.

References Cited in the file of this patent

UNITED STATES PATENTS

| | | |
|---|---|---|
| 1,390,062 | Smith | Sept. 6, 1921 |
| 1,741,605 | Baumann | Dec. 31, 1929 |

FOREIGN PATENTS

| | | |
|---|---|---|
| 579,317 | Germany | June 23, 1933 |